(12) United States Patent
Wegelin et al.

(10) Patent No.: US 10,800,646 B2
(45) Date of Patent: Oct. 13, 2020

(54) REFILL CONTAINER LABELING

(71) Applicant: GOJO Industries, Inc., Akron, OH (US)

(72) Inventors: Jackson William Wegelin, Stow, OH (US); Chip W. Curtis, La Moille, IL (US)

(73) Assignee: GOJO Industries, Inc., Akron, OH (US)

(*) Notice: Subject to any disclaimer, the term of this patent is extended or adjusted under 35 U.S.C. 154(b) by 0 days.

(21) Appl. No.: 16/538,223

(22) Filed: Aug. 12, 2019

(65) Prior Publication Data

US 2019/0359477 A1 Nov. 28, 2019

Related U.S. Application Data

(63) Continuation-in-part of application No. 15/904,704, filed on Feb. 26, 2018, now Pat. No. 10,377,624, (Continued)

(51) Int. Cl.
*B67D 7/34* (2010.01)
*B65C 3/08* (2006.01)
(Continued)

(52) U.S. Cl.
CPC ............. *B67D 7/346* (2013.01); *B65B 61/26* (2013.01); *B65C 3/08* (2013.01); *G09F 3/00* (2013.01);
(Continued)

(58) Field of Classification Search
CPC .......... B67D 7/346; B65B 61/26; B65C 3/08; G09F 3/00; Y10T 428/24802; G02B 26/10; G06K 7/10; G06K 7/14; G06K 7/1404; G06K 19/06; G06K 19/06009; G06F 2003/0213; G06F 2003/0272; G06F 2003/0208
(Continued)

(56) References Cited

U.S. PATENT DOCUMENTS 8,237,558 B2 * 8/2012 Seyed Momen ......... G01S 1/70
340/539.11
8,687,290 B2 * 4/2014 Jahn .................... G02B 27/0025
359/738
(Continued)

*Primary Examiner* — Paul R Durand
*Assistant Examiner* — Andrew P Bainbridge
(74) *Attorney, Agent, or Firm* — Cooper Legal Group, LLC

(57) ABSTRACT

Among other things, one or more systems and/or techniques for labeling a refill contain and/or for enabling operation of the refill container by a dispensing system based upon one or more indicia of the label satisfying a dispensing key are provided. In an example, a label may be applied to a refill container. The label may comprise a first region having a first indicia that may correspond to a shape, color, and/or texture (e.g., a yellow star indicia). A dispensing system may enable operation of the refill container (e.g., installation and/or dispensing of material from the refill container) based upon the first indicia satisfying a dispensing key (e.g., a yellow key component and/or a star shape component). Otherwise, the dispensing system does not enable operation of the refill container (e.g., the refill container is not genuine or is not an appropriate refill container type).

20 Claims, 12 Drawing Sheets

Related U.S. Application Data which is a continuation of application No. 14/588,822, filed on Jan. 2, 2015, now Pat. No. 9,902,606, which is a continuation of application No. 14/041,631, filed on Sep. 30, 2013, now abandoned, which is a continuation-in-part of application No. 13/770,504, filed on Feb. 19, 2013, now Pat. No. 9,120,106.

(51) Int. Cl.

| | | |
|---|---|---|
| *B65B 61/26* | (2006.01) | |
| *G09F 3/00* | (2006.01) | |
| *G09F 3/02* | (2006.01) | |
| *G06K 7/14* | (2006.01) | |
| *G02B 26/10* | (2006.01) | |
| *G06K 19/06* | (2006.01) | |
| *G06K 7/10* | (2006.01) | |

(52) U.S. Cl.
CPC ............. *G02B 26/10* (2013.01); *G06K 7/10* (2013.01); *G06K 7/14* (2013.01); *G06K 7/1404* (2013.01); *G06K 19/06* (2013.01); *G06K 19/06009* (2013.01); *G09F 2003/0208* (2013.01); *G09F 2003/0213* (2013.01); *G09F 2003/0272* (2013.01); *Y10T 428/24802* (2015.01)

(58) Field of Classification Search
USPC .................................................. 222/23, 504
See application file for complete search history.

(56) References Cited

U.S. PATENT DOCUMENTS

| | | | | |
|---|---|---|---|---|
| 8,879,832 | B2* | 11/2014 | Dalal | G06K 7/1408 |
| | | | | 235/462.01 |
| 9,120,106 | B2* | 9/2015 | Wegelin | B05B 11/0054 |
| 10,377,624 | B2* | 8/2019 | Wegelin | B67D 7/346 |
| 2006/0218011 | A1* | 9/2006 | Walker | G07F 17/32 |
| | | | | 705/3 |
| 2013/0020351 | A1* | 1/2013 | Pelfrey | A47K 5/1214 |
| | | | | 222/23 |
| 2014/0231448 | A1* | 8/2014 | Wegelin | B05B 11/0054 |
| | | | | 222/23 |
| 2014/0231449 | A1* | 8/2014 | Wegelin | B67D 7/346 |
| | | | | 222/23 |
| 2019/0359477 | A1* | 11/2019 | Wegelin | B65B 61/26 |

\* cited by examiner

REFILL CONTAINER LABELING

RELATED APPLICATION

This application claims priority to and is a continuation-in-part of Ser. No. 15/904,704, titled "REFILL CONTAINER LABELING" and filed on Feb. 26, 2018, which is a continuation of Ser. No. 14/588,822, titled "REFILL CONTAINER LABELING" and filed on Jan. 2, 2015, which is a continuation of U.S. patent application Ser. No. 14/041,631, titled "REFILL CONTAINER LABELING" and filed on Sep. 30, 2013, which is a continuation-in-part of U.S. patent application Ser. No. 13/770,504, titled "REFILL CONTAINER LABELING" and filed on Feb. 19, 2013. U.S. patent applications Ser. Nos. 15/904,704, 14/588,822, 14/041,631 and 13/770,504 are incorporated herein by reference.

TECHNICAL FIELD

The instant application is generally directed towards dispensing systems. For example, the instant application is directed toward a dispensing system that enables operation of a refill container based upon a label of the refill container satisfying a dispensing key, such as a color key component, a shape key component, and/or a texture key component.

BACKGROUND

Many locations, such as hospitals, factories, restaurants, homes, etc., utilize dispensing systems to dispense material. For example, a dispensing system may dispense a liquid material, powder material, aerosol material, and/or other materials (e.g., soap, anti-bacterial gels, cleansers, disinfectants, lotions, etc.). Some dispensing systems utilize a refill container for ease of maintenance, environmental concerns, etc. The refill container may, for example, comprise a pump and/or nozzle mechanism that can be used by a dispensing system to dispense material from the refill container.

A manufacturer of a material may utilize one or more distributors to install dispensing systems at various end-user locations, and to install refill containers provided by the manufacturer into corresponding dispensing systems. Refill containers comprising various materials may be interchangeably inserted into the dispensing system, and the particular material that is to be inserted into the dispensing system may depend upon an environment or application in which the dispensing system is to be used. The manufacturer may rely upon a distributor to install a refill container comprising a material suitable for the application into a dispensing system. For example, a distributor may be required to install a refill container such that a dispensing system in an operating room of a hospital would dispense anti-bacterial soap, as opposed to moisturizer.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more labels for use with refill containers, one or more dispensing systems for controlling operation of refill containers, and/or one or more techniques for labeling refill containers are provided herein. In some embodiments, a label used to satisfy a dispensing key of a dispensing system is provided. In an example, the label may comprise a direct label that is printed, such as through an in-line printing technique, onto a refill container. In another example, the label may comprise a label that is attached to the refill container. The label comprises a first region having first indicia that is detectable by the dispensing system. In an example, the first indicia comprises a first color, a first shape, and/or a first texture. If the first indicia satisfies a dispensing key (e.g., an acceptable color or color range, an acceptable shape or shape range, and/or an acceptable texture or texture range, etc.), then the dispensing system enables operation of the refill container (e.g., installation of the refill container and/or dispensing of material from the refill container, etc.), otherwise the dispensing system does not enable operation of the refill container (e.g., because the refill container is not of a correct type, is not genuine, etc.). It will be appreciated that "indicia" and/or the like as used herein are generally intended to include one or more. That is, although indicia may be regarded as plural in the general vernacular, a single color, a single shape, etc. may be regarded as indicia as used herein.

In an example, a first visual detector, such as a red, green, blue light-emitting diode (RGB LED), may conduct based upon the detection of light interacting with the first region, which may be identified as detected color levels that may be compared with acceptable color levels specified by the dispensing key. For example, the detected color levels and the acceptable color levels may be compared based upon cylindrical color coordinates corresponding to a hue, saturation, and luminance (HSL) model or other color model. In another example, the label comprises a second region having a second indicia, such as a second color, a second shape, and/or a second texture. If the first indicia and the second indicia satisfy the dispensing key, then the dispensing system enables operation of the refill container, otherwise the dispensing system does not enable operation of the refill container. In this way, the label may comprise one or more regions having indicia that may be compared with the dispensing key to determine operability of the refill container.

In some embodiments, a dispensing system for controlling operation of a refill container is provided. The dispensing system comprises a dispenser configured to dispense a material, such as a liquid, powder, or aerosol, from the refill container seated within a designated space or area within the dispensing system. The dispensing system comprises a first illuminator configured to emit light substantially towards a first region of a label applied to the refill container (e.g., a label directly printed onto the refill container, a label affixed to the refill container, a label integrally formed with the refill container, etc.). For example, the refill container may be positioned within a housing of the dispensing system, such that the first illuminator can emit light substantially towards the label. A gasket or other device may be used to block ambient light. The dispensing system comprises a first visual detector that is configured to detect a first indicia of the first region based upon interaction of the emitted light with the first region. It may be appreciated that various types of visual detectors may be used, such as photodiodes, cameras, optical sensors, active pixel sensors, etc. In an example, the first visual detector comprises an RGB LED configured to detect one or more detected color levels, such as a blue, green, and/or red color levels, associated with the first region. The one or more detected color levels may, for example, be converted into cylindrical color coordinates based upon an HSL model or other color model, for example.

In some embodiments, the dispensing system comprises a validator configured to compare the first indicia with a dispensing key, such as acceptable cylindrical color coordinates derived from acceptable color levels and the HSL model. Responsive to the first indicia satisfying the dispensing key, the validator enables operation of the refill container such that the dispensing system accepts installation of the refill container and/or the dispenser dispenses material from the refill container, for example. Otherwise, the validator does not enable operation of the refill container. In an example, the dispensing system comprises multiple illuminators and/or visual detectors, such that multiple regions of the label may be evaluated to determine whether to enable operation of the refill container.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
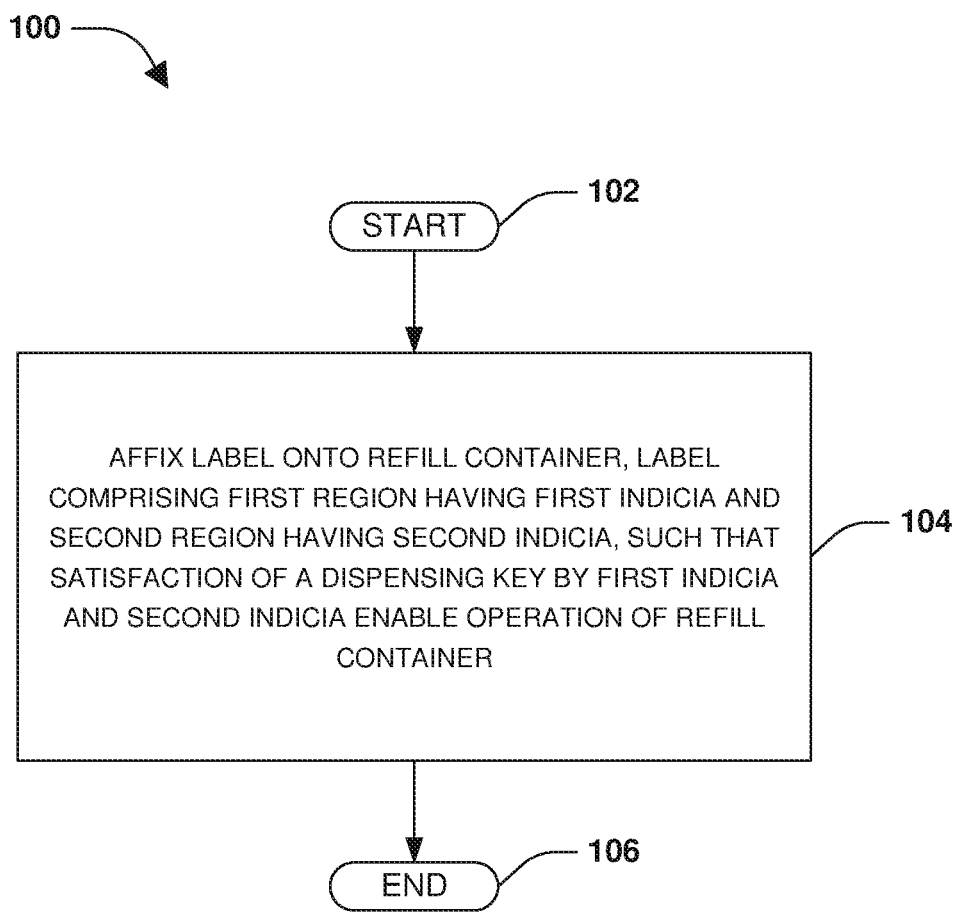
FIG. 1 is a flow diagram illustrating a method of keying a refill container for a dispensing system, according to some embodiments.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Application of Indicia to Refill Container

An embodiment of keying a refill container for a dispensing system is illustrated by an exemplary method 100 of FIG. 1, and one or more labels formed by such a methodology are illustrated in FIGS. 2-6. At 102, the method 100 starts. The dispensing system may be configured to dispense material, such as liquid, from a refill container based upon a label of the refill container satisfying a dispensing key, such as a color key component (e.g., cylindrical color coordinates derived from a hue, saturation, luminance (HSL) model), a shape key component, a texture key component, etc. It may be appreciated that the refill container may function to dispense material contained therein. In an example, the dispensing system and the refill container may act in concert to dispense material to a user. At 104, the label is applied to the refill container. In an example, the label is affixed or attached to the refill container. In another example, the label is directly printed onto the refill container. In another example, such as where the label comprises a texture, for example, the label is formed within or as part of the refill container. For example, where the refill container is formed from a molded plastic, the label (e.g., and/or indicia thereof) may be incorporated into the mold used to form the refill container. The label may, however, be made as part of the refill container in other manners as well. It will be appreciated that any one or more of the foregoing and/or other label creation, label application, etc. techniques may be used alone or in combination with one another (e.g., where a label has a first region comprising color indicia and second region comprising texture indicia, where a first label has a first region with a first type of indicia and a second label has a second region with a second type of indicia, etc.). Application of a label, a label that is applied and/or like verbiage is intended to comprise any one or more of foregoing scenarios (e.g., attached, printed on, integral with, etc.). At 106, the method 100 ends.

The label comprises one or more regions having indicia (e.g., color, shape, texture, etc.) detectable by the dispensing system. For example, the label comprises a first region having a first indicia and a second region having a second indicia. If the first indicia and the second indicia satisfy a dispensing key, then the dispensing system enables operation of the refill container (e.g., installation of the refill container, dispensing of material from the refill container, etc.), otherwise the dispensing system does not enable operation of the refill container (e.g., because the refill container is not genuine, the refill container is an incorrect refill container type for the particular dispensing system, etc.). In some embodiments, the indicia is a quick response (QR) code or a barcode.

In some embodiments, the label is formed, at least in part, from an ink that changes properties (e.g., visibility, color, texture, shape, etc.) based upon time, humidity, temperature, light, and/or other factors. In an example, the dispensing key may correspond to a first key component associated with a first state of the label at a first point in time (e.g., before alteration of the ink), and a second key component associated with a second state of the label at a second point in time (e.g., after alteration of the ink over time and/or based upon the label being exposed to humidity, temperature, light, etc.).

Figure 2:
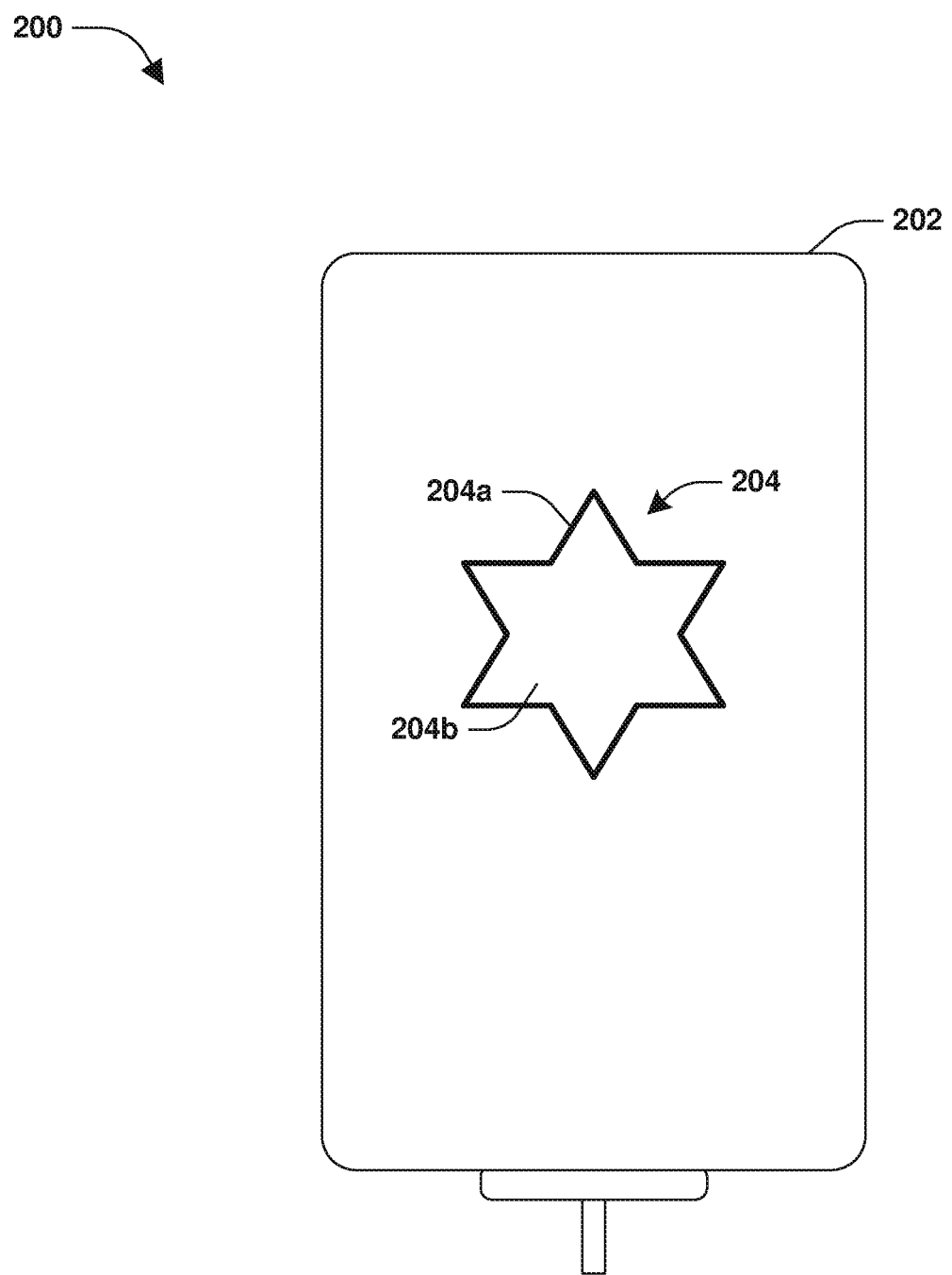
FIG. 2 is an illustration of a label, applied to a refill container, comprising a first region, according to some embodiments.

In some embodiments, a refill container 202 has a label comprising a first region having a shaped indicia, as illustrated by example 200 of FIG. 2. In the illustrated example, the shaped indicia comprises a star shaped indicia 204. When the refill container 202 is placed into a housing of a dispensing system, the dispensing system may determine whether the star shaped indicia 204 corresponds to a dispensing key, such as a star shaped key component of the dispensing key. In an example, a visual detector of a dispensing system may detect interaction of emitted light with the star shaped indicia 204. For example, the visual detector may identify a first colored portion 204a (e.g., black) that outlines a second colored portion 204b (e.g., white). A validator of the dispensing system may determine whether the star shaped indicia 204 corresponds to a dispensing key, such as the star shaped key component of the dispensing key. If the star shaped indicia 204 satisfies the dispensing key (e.g., the first colored portion 204a and/or second colored portion 204b correspond to a shape(s) and/or a color(s) of the star shaped key component), then the dispensing system enables operation of the refill container 202. Otherwise, the dispensing system does not enable operation of the refill container 202 (e.g., the star shaped key component corresponds to a particular range of green colors, and thus the black and white colors of the first colored portion 204a and/or second colored portion 204b, respectively, do not correspond to the range of green colors specified by the star shaped key component, so the dispensing system does not enable operation of the refill container 202, the dispensing system does not enable operation of the refill container 202). In this way, one or more shape-based labeling techniques may be used to label refill containers to selectively enable dispensing material therefrom, for example.

In some embodiments, a refill container 302 has a label comprising multiple indicia. For example, the label may comprise a first region having a circular shaped indicia 306 and a second region having an octagonal shaped indicia 304, as illustrated by example 300 of FIG. 3. The first region is separated from the second region by an inactive region 308 (e.g., a region that does not affect operation of the refill container 302). The circular shaped indicia 306 is configured according to a red color and a circular shape, and the octagonal shaped indicia 304 is configured according to a green color and an octagonal shape. In an example, a first visual detector of a dispensing system may detect interaction of emitted light with the circular shaped indicia 306. A validator of the dispensing system may determine whether the circular shaped indicia 306 corresponds to a dispensing key (e.g., a first shape key component of the dispensing key and/or a first color key component of the dispensing key). A second visual detector of the dispensing system may detect interaction of emitted light with the octagonal shaped indicia 304. The validator of the dispensing system may determine whether the octagonal shaped indicia 304 corresponds to the dispensing key (e.g., a second shape key component of the dispensing key and/or a second color key component of the dispensing key). If the circular shaped indicia 306 and/or the octagonal shaped indicia 304 satisfy the dispensing key (e.g., where a first shape criterion of the dispensing key is a circular shape, a first color criterion of the dispensing key is red, a second shape criterion of the dispensing key is an octagonal shape, and a second color criterion of the dispensing key is green), then the dispensing system enables operation of the refill container 302. Otherwise, the dispensing system does not enable operation of the refill container 302 (e.g., where a first color criterion of the dispensing key corresponds to purple instead and the circular shaped indicia 306 is red, the dispensing system does not enable operation of the refill container 302). It may be appreciated that in another example, the dispensing key may merely comprise the first color key component and the second color key component (e.g., but no shape key components). In this way, the validator may enable or disable operation of the refill container 302 based upon determining whether the red color of the circular shaped indicia 306 and the green color of the octagonal shaped indicia 304 satisfy the first color key component and the second color key component. In this way, one or more color labeling techniques and/or one or more shape-based labeling techniques may be used to label refill containers to selectively enable dispensing material therefrom, for example.

In some embodiments, a refill container 402 has a label comprising multiple indicia. For example, the label may comprise a first region having a star shaped indicia 406, a second region having a cross shaped indicia 408, and an inactive region 404, as illustrated by example 400 of FIG. 4. The inactive region 404 may be applied to the refill container 402 as a "fake" region that does not affect operation of the refill container 402. Accordingly, the star shaped indicia 406 and the cross shaped indicia 408, but not the inactive region 404, may be compared with a dispensing key to determine whether operation of the refill container 402 is to be enabled. In this way, the inactive region 404 may be applied to refill containers to mitigate replication of labels (e.g., counterfeit labels) used to enable operation of refill containers (e.g., by creating uncertainty as to what particular indicia will trigger operation of a refill container).

In an example, the first region is located on a first surface 402a (e.g., a front surface) of the refill container 402 and the second region is located on a second surface 402b (e.g., a surface that is different than the front surface). It may be appreciated that the first region, the second region, and/or other regions not illustrated may be located on any surface of the refill container 402 (e.g., a top surface, a bottom surface, a side surface, the front surface, a back surface, etc.). It will be appreciated that a dispensing system may comprise one or more visual detectors that are positioned within the dispensing system such that the one or more visual detectors are capable of detecting respective surfaces (e.g., and indicia thereon) of the refill container 402. It will also be appreciated that the instant disclosure, including the scope of the appended claims, are not intended to be limited to the examples provided herein. For example, any one or more shapes, colors, textures, etc. may be utilized, implemented, etc., and not merely star, circular, cross shapes, for example.

In some embodiments, a refill container 502 has a label comprising multiple indicia. For example, the label may comprise a first region having a textured indicia 504, as illustrated by example 500 of FIG. 5. The textured indicia 504 is configured according to an arrow shape and a nub texture. In an example, a visual detector of a dispensing system may detect interaction of emitted light with the textured indicia 504. A validator of the dispensing system may determine whether the arrow shape and/or the nub texture satisfy a dispensing key. In an example, the validator may enable operation of the refill container 502 if the nub texture satisfies a texture key component of the dispensing key or the arrow shape satisfies a shape key component of the dispensing key. In another example, the validator will enable operation of the refill container 502 only if the nub texture satisfies the texture key component and the arrow shape satisfies a shape key component. In this way, one or more texture labeling techniques may be used to label refill containers to selectively enable dispensing material therefrom, for example.

In some embodiments, a refill container 602 has a label comprising multiple indicia. For example, the label may comprise a first 3D region having a first circular indicia 604 and a second 3D region having a first polygonal indicia 606, a second polygonal indicia 608, and a third polygonal indicia 610, as illustrated by example 600 of FIG. 6. In an example, a first visual detector (e.g., a first RGB LED) of a dispensing system may detect interaction of emitted light (e.g., from a first white LED or other light source) with the first circular indicia 604. A validator of the dispensing system may determine whether a yellow color and/or a circular shape of the first circular indicia 604 satisfy a dispensing key, such as a first shape key component of the dispensing key and/or a first color key component of the dispensing key. A second visual detector (e.g., a second RGB LED) of the dispensing system may detect interaction of emitted light (e.g., from the first white LED or other light source) with the first polygonal indicia 606. In an example, the first circular indicia 604 and the first polygonal indicia 606 may be formed at similar or different depths. The validator may determine whether a red color and/or a polygonal shape of the first polygonal indicia 606 satisfy the dispensing key, such as a second shape key component of the dispensing key and/or a second color key component of the dispensing key. A third visual detector (e.g., a third RGB LED) of the dispensing system may detect interaction of emitted light (e.g., from a second white LED or other light source) with the second polygonal indicia 608. The validator may determine whether a yellow color and/or a polygonal shape of the second polygonal indicia 608 satisfy the dispensing key, such as a third shape key component of the dispensing key and/or a third color key component of the dispensing key. A fourth visual detector (e.g., a fourth RGB LED) of the dispensing system may detect interaction of emitted light (e.g., from a third white LED or other light source) with the third polygonal indicia 610. The validator may determine whether a green color and/or a polygonal shape of the third polygonal indicia 610 satisfy the dispensing key, such as a fourth shape key component of the dispensing key and/or a fourth color key component of the dispensing key. In this way, if first circular indicia 604, the first polygonal indicia 606, the second polygonal indicia 608, and/or the third polygonal indicia 610 satisfy the dispensing key, then operation of the refill container 602 may be enabled. In this way, one or more 3D labeling techniques may be used to label refill containers to selectively enable dispensing material therefrom, for example. As such, a label (e.g., or one or more labels) may be applied to, formed within, etc. a refill container such that satisfaction of a dispensing key by the label may enable operation of the refill container. It will be appreciated that one or more of the foregoing may overlap. For example, a single detector component may comprise the one or more visual detectors (e.g., LEDs) or multiple detector components may comprise the one or more visual detectors (e.g., LEDs).

Figure 7:
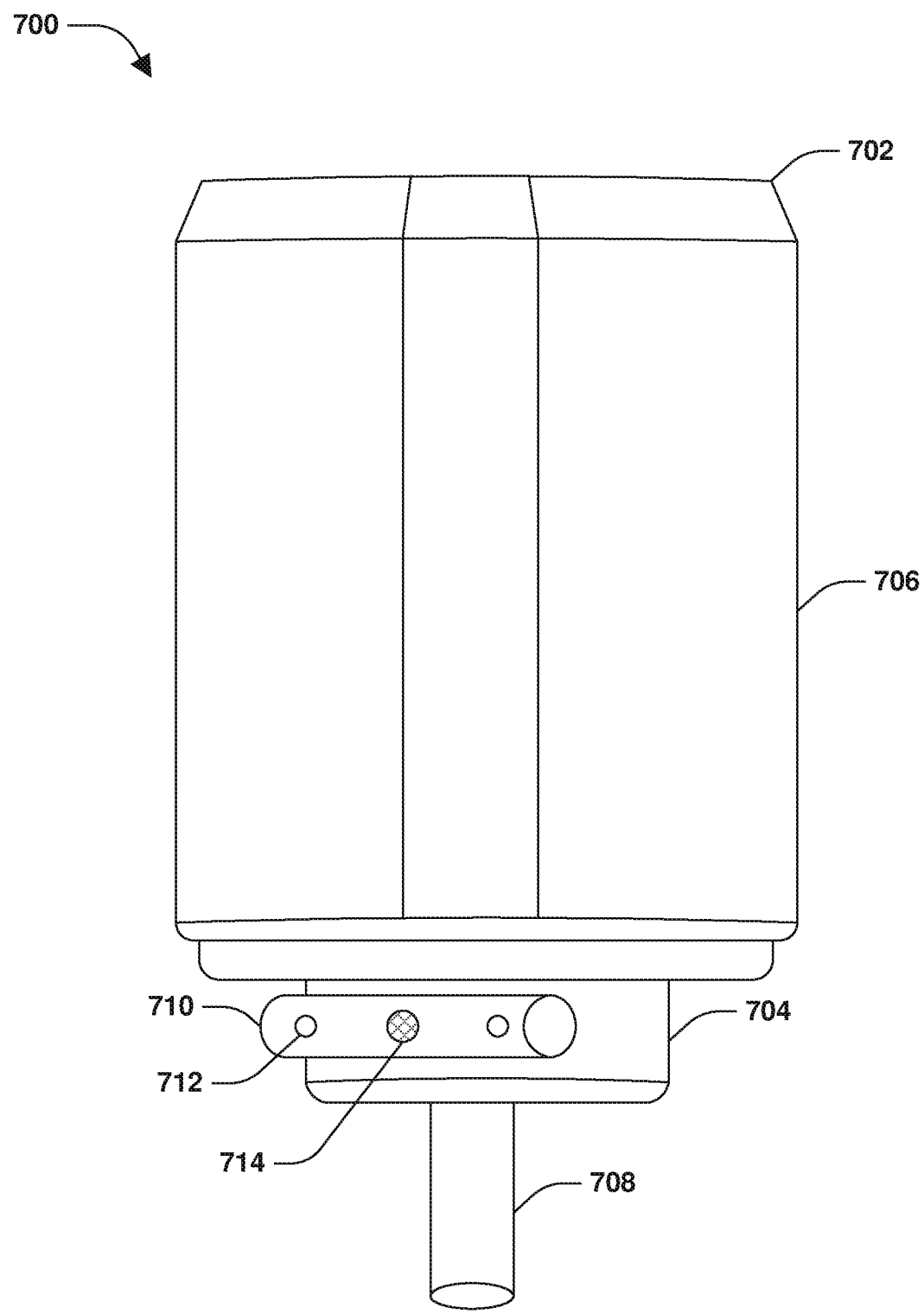
FIG. 7 is an illustration of an indicia applied to a refill container, according to some embodiments.

In some embodiments, a refill container further comprises a power source, such as a battery, and one or more indicia are disposed on the refill container proximate to the power source. For example, referring to example 700 of FIG. 7, a refill container 702 comprises a collar 704 that is disposed between a reservoir 706 of the refill container 702 and a nozzle 708 or outlet through which material stored in the reservoir 706 exits the refill container 702 during a dispensing event. In some embodiments, the collar 704 defines a compartment 710 for housing the power source and comprises contacts 712 for electrically coupling the refill container 702 to the dispensing system or components thereof, such as an illuminator, a visual detector, a validator, a pump, etc. In some embodiments, power is provided from the power source to the dispensing system or the components thereof through the contacts 712, which contact corresponding contacts in the dispensing system when the refill container is seated within (e.g., disposed within) the dispensing system. In some embodiments, an indicia 714 is disposed on the collar 704, such as on a surface of the collar 704 that defines the compartment 710 for housing the energy source.

Dispensing System

Figure 8:
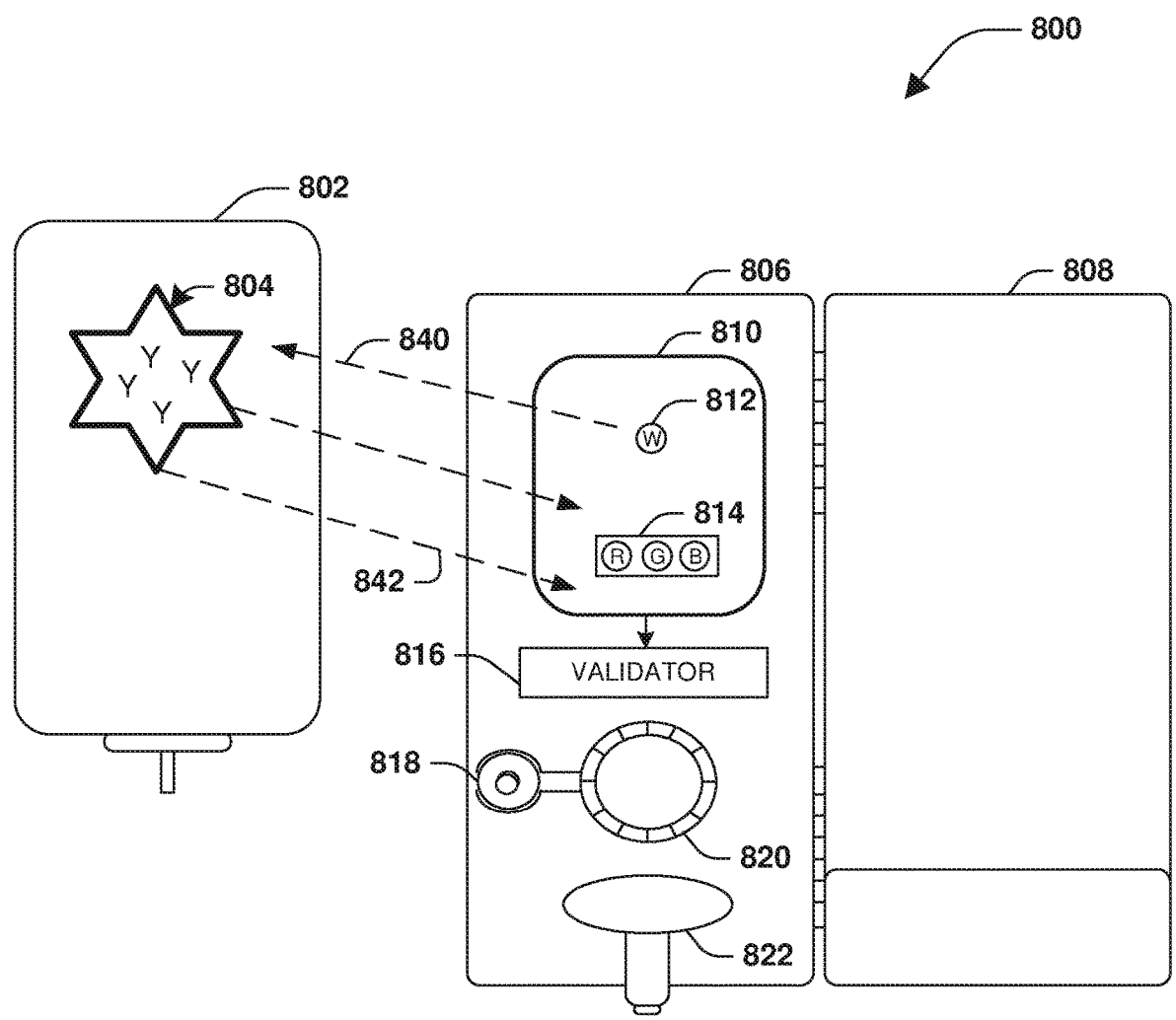
FIG. 8 is a component block diagram illustrating a system for controlling operation of a refill container, according to some embodiments.

FIG. 8 illustrates an example of a dispensing system 800 for controlling operation of a refill container 802. The refill container 802 may comprise a label (e.g., a label directly printed onto the refill container 802, a label attached to the refill container 802, a label formed as part of the refill container 802, etc.). The label may comprise a first region having a yellow star indicia 804. The dispensing system 800 may be configured to enable operation of the refill container 802 (e.g., installation of the refill container 802, dispensing of material from the refill container 802, etc.) based upon whether the yellow star indicia 804 satisfies a dispensing key.

The dispensing system 800 comprises a housing 806 that, in the illustrated example, is operably coupled to a door 808. In an example, the door 808 may pivot open from the housing 806 so that the refill container 802 may be positioned or seated within a space defined within the housing 806 for installation (e.g., when operation of the refill container 802 is enabled as provided herein). The housing 806 may comprise various mechanical and/or electrical components that facilitate operation of the dispensing system 800, such as one or more components that dispense material from the refill container 802. For example, the housing 806 may comprise a motor 818 and a gear train 820 used to operate a dispenser 822 that is configured to dispense material from the refill container 802 when a user activates the dispensing system 800 (e.g., a user may engage a dispense lever or place a hand under an optical actuator) (e.g., when operation of the refill container 802 is enabled as provided herein).

The dispensing system 800 may be configured control operation of the refill container 802 based upon the label, such as the yellow star indicia 804, satisfying a dispensing key. The dispensing system 800 may comprise a first illuminator 812, such as a white LED or other light source. The first illuminator 812 may be configured to emit light 840 substantially towards the first region (e.g., towards the yellow star indicia 804) of the label of the refill container 802. In an example, a gasket 810 may be configured to block ambient light during operation of the first illuminator 812 (e.g., the gasket 810 may form a substantially opaque seal around the first region of the label when the refill container is seated within the housing 806). The dispensing system 800 may comprise a first visual detector 814. It may be appreciated that the first visual detector 814 may comprise various types of visual detection components, such as one or more light-emitting diodes (LEDs), a red, green, blue (RGB) LED, an optical sensor, a photodiode, a photosensor, an active pixel sensor, a camera, etc. (e.g., an example of an RGB LED is illustrated in example 1000 of FIG. 10). The first visual detector 814 is configured to detect a first indicia, such as the yellow star indicia 804, of the first region based upon interaction (e.g., reflection 842) of the emitted light, from the first illuminator 812, with the first region. For example, the first visual detector 814 may identify one or more detected color levels of the yellow star indicia 804, such as a red color level corresponding to conductivity associated with a red LED, a green color level corresponding to conductivity associated with a green LED, and/or a blue color level corresponding to conductivity associated with a blue LED (e.g., based upon wavelength(s) of light reflected from the yellow star indicia 804). In an example, a hue, saturation, luminance (HSL) model or other color model may be used to convert the one or more detected color levels into detected cylindrical color coordinates that may be compared to acceptable cylindrical color coordinates specified by the dispensing key.

The dispensing system 800 may comprise a validator 816 that is configured to compare the yellow star indicia 804 with the dispensing key. In an example, responsive to the yellow star indicia 804 satisfying the dispensing key (e.g., the detected cylindrical color coordinates may correspond to the acceptable cylindrical color coordinates specified by the dispensing key), the validator 816 enables operation of the refill container 802 such that the housing 806 accepts installation of the refill container 802 and/or the dispenser 822 dispenses material of the refill container 802 (e.g., the motor 818, the gear train 8220, and/or other components within the housing 806 may become operational). Otherwise, the validator 816 does not enable operation of the refill container 802 because the label, such as the yellow star indicia 804, does not satisfy the dispensing key (e.g., the refill container 802 is not genuine, is not the correct refill container type, etc.).

Figure 9:
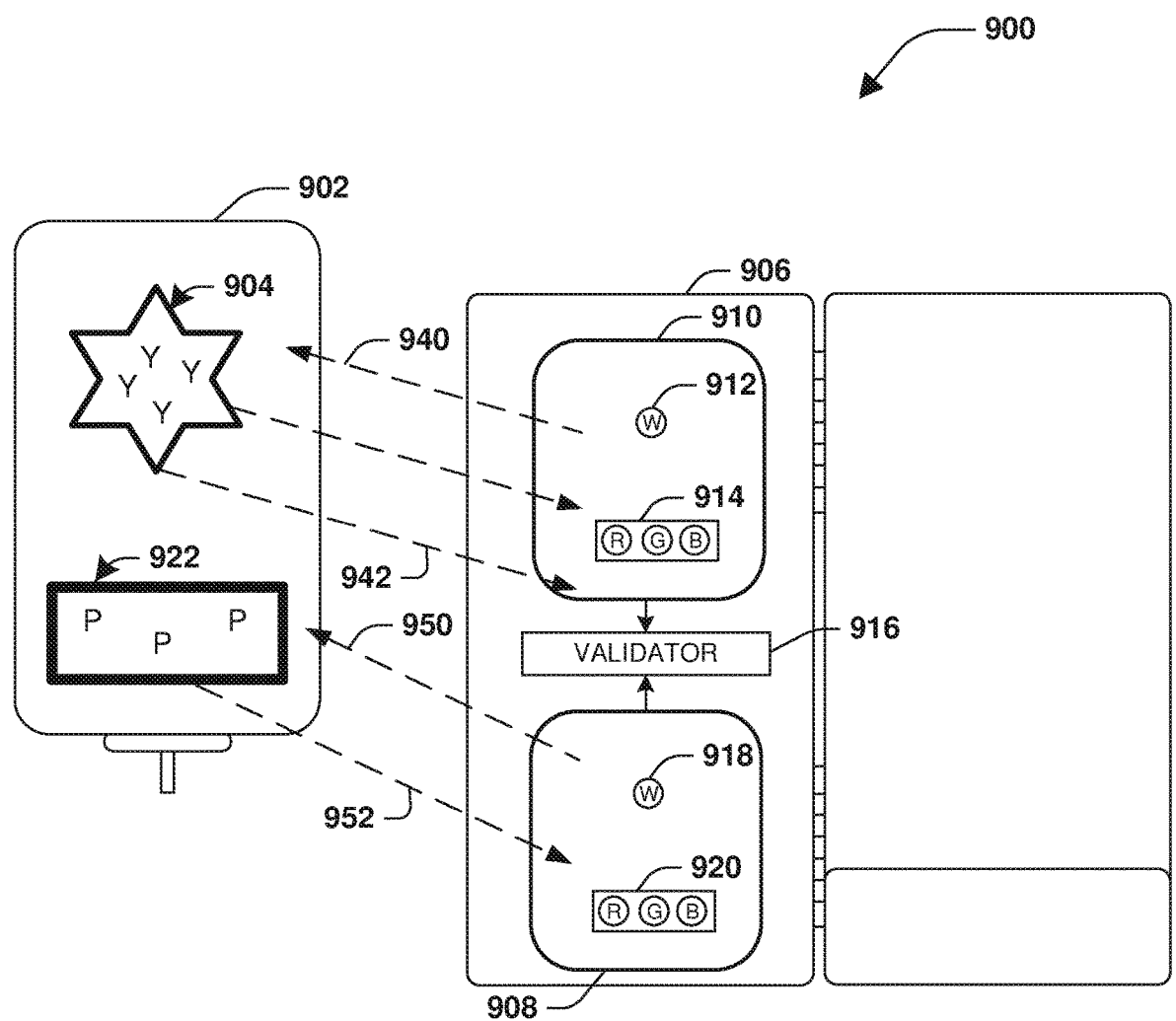
FIG. 9 is a component block diagram illustrating a system for controlling operation of a refill container, according to some embodiments.

FIG. 9 illustrates an example of a dispensing system 900 for controlling operation of a refill container 902. The refill container 902 may comprise a label (e.g., a label directly printed onto the refill container 902, a label attached to the refill container 902, a label formed as part of the refill container 902, etc.). The label may comprise a first region having a yellow star indicia 904 and a second region comprising a purple polygon indicia 922. The dispensing system 900 may be configured to enable operation of the refill container 902 (e.g., installation of the refill container 902, dispensing of material from the refill container 902, etc.) based upon whether the yellow star indicia 904 and/or the purple polygon indicia 922 satisfy a dispensing key.

The dispensing system 900 comprises a housing 906 that may comprise various mechanical and/or electrical components that facilitate operation of the dispensing system 900, such as dispensing material from the refill container 902. The dispensing system 900 may be configured to control operation of the refill container 902 based upon the label, such as the yellow star indicia 904 and/or the purple polygon indicia 922, satisfying the dispensing key.

The dispensing system 900 may comprise a first illuminator 912, such as a white LED or other light source. The first illuminator 912 may be configured to emit light 940 substantially towards the first region (e.g., towards the yellow star indicia 904) of the label of the refill container 902. In an example, a first gasket 910 may be configured to block ambient light during operation of the first illuminator 912 (e.g., the first gasket 910 may form a substantially opaque seal around the first region of the label when the refill container is seated within the housing 906). The dispensing system 900 may comprise a first visual detector 914 that is configured to detect a first indicia, such as the yellow star indicia 904, of the first region based upon interaction (e.g., reflection 942) of the emitted light, from the first illuminator 912, with the first region. For example, the first visual detector 914 may detect one or more detected color levels of the yellow star indicia 904, such as a red color level corresponding to conductivity associated with a red LED, a green color level corresponding to conductivity associated with a green LED, and/or a blue color level corresponding to conductivity associated with a blue LED (e.g., based upon wavelength(s) of light reflected from the yellow star indicia 904). The one or more detected color levels of the yellow star indicia 904 may be compared with a first color key component and/or a first shape key component of the dispensing key.

The dispensing system 900 may comprise a second illuminator 918, such as a white LED or other light source. The second illuminator 918 may be configured to emit light 950 substantially towards the second region (e.g., towards the purple polygon indicia 922) of the label of the refill container 902. In an example, a second gasket 908 may be configured to block ambient light during operation of the second illuminator 918 (e.g., the second gasket 908 may form a substantially opaque seal around the second region of the label when the refill container is seated within the housing 906). The dispensing system 900 may comprise a second visual detector 920 that is configured to detect a second indicia, such as the purple polygon indicia 922, of the second region based upon interaction (e.g., reflection 952) of the emitted light, from the second illuminator 918, with the second region. For example, the second visual detector 920 may detect one or more second detected color levels of the purple polygon indicia 922, such as a second red color level corresponding to conductivity associated with a red LED, a second green color level corresponding to conductivity associated with a green LED, and/or a second blue color level corresponding to conductivity associated with a blue LED (e.g., based upon wavelength(s) of light reflected from the purple polygon indicia 922). The one or more second detected color levels of the purple polygon indicia 922 may be compared with a second color key component and/or a second shape key component of the dispensing key.

The dispensing system 900 may comprise a validator 916 that is configured to compare the yellow star indicia 904 and/or the purple polygon indicia 922, such as the one or more detected color levels and/or the one or more second detected color levels, with the dispensing key. That is, responsive to the yellow star indicia 904 and/or the purple polygon indicia 922 satisfying the dispensing key, the validator 916 enables operation of the refill container 902 such that the housing 906 accepts installation of the refill container 902, the dispenser dispenses material of the refill container 902, etc. Otherwise, the validator 916 does not enable operation of the refill container 902 because the label, such as the yellow star indicia 904 and/or the purple polygon indicia 922, do not satisfy the dispensing key (e.g., the refill container 902 is not genuine and/or is not the correct refill container type).

Figure 10:
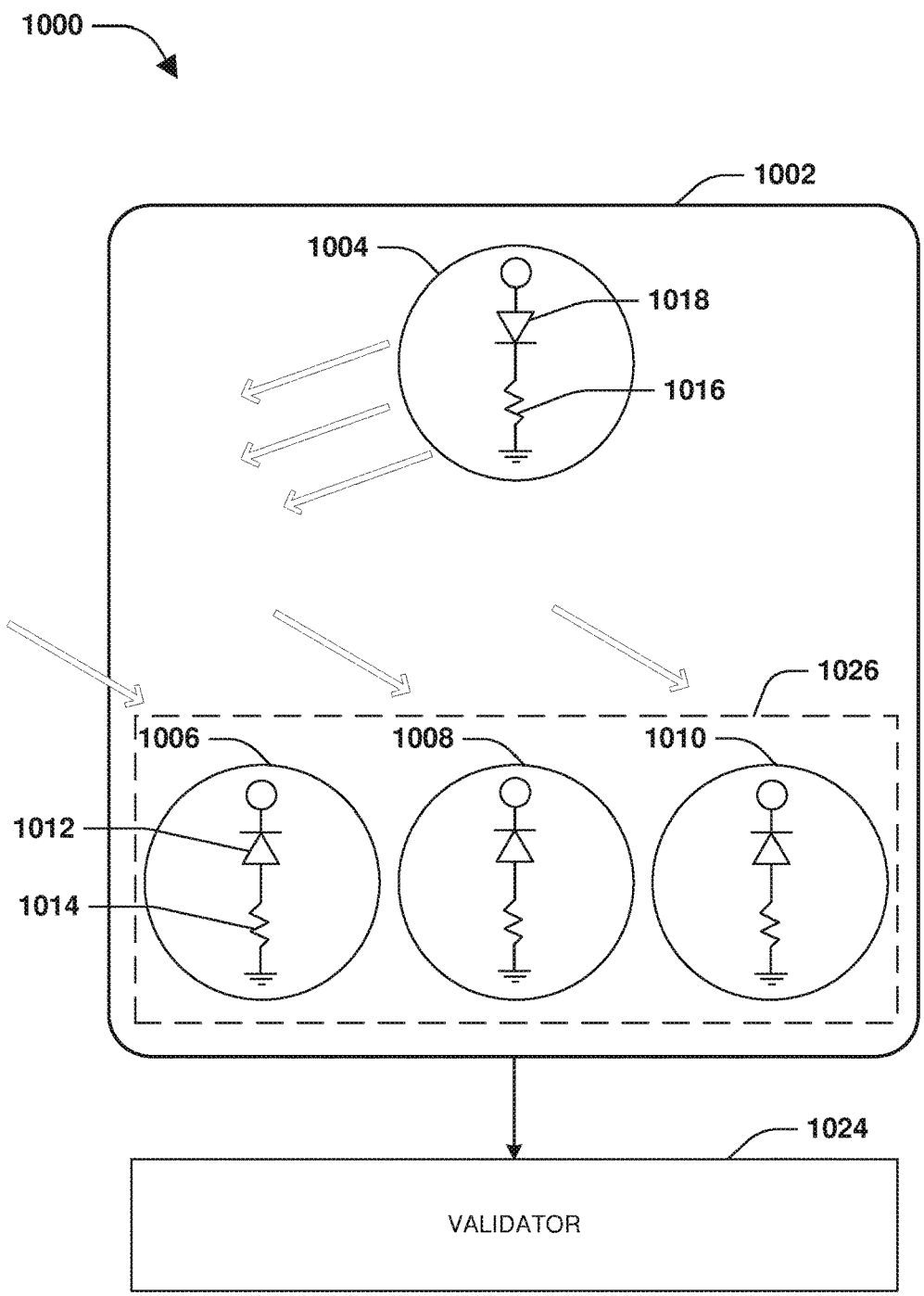
FIG. 10 is an illustration of an illuminator, a visual detector, and a validator, according to some embodiments.

FIG. 10 illustrates an example 1000 of a dispensing system 1002 comprising an illuminator 1004, a visual detector 1026, and a validator 1024. In an example, the illuminator 1004 comprises a white light-emitting diode (LED) or other light source. For example, the white LED may comprise a diode 1018 that is coupled to ground through a resistor 1016. The illuminator 1004 is configured to emit light substantially towards one or more regions of a label of a refill container. In an example, the visual detector 1026 comprises a red, green, blue light-emitting diode (RGB LED) comprising a first photodiode 1006 (e.g., used to detect a red color level, such as based upon a wavelength corresponding to red), a second photodiode 1008 (e.g., used to detect a green color level, such as based upon a wavelength corresponding to green), and/or a third photodiode 1010 (e.g., used to detect a blue color level, such as based upon a wavelength corresponding to blue). For example, the first photodiode 1006 comprises a reverse biased diode 1012 that is coupled to ground through a resistor 1014 (e.g., a 1 megaohm resistor or a resistor having a relatively large resistance).

In an example, a photodiode is configured to operate in a photovoltaic detection mode, such that the photodiode produces a voltage when exposed to light. In another example, a photodiode is configured to operate in a photoconductive detection mode, such that electrical conductivity of the photodiode is controlled based upon exposure to light (e.g., a photocurrent is created based upon the detected light). In some embodiments, an LED is charged to a first voltage, such as a voltage representing a logical 1 (e.g., charged to 5 voltages within 100 to 200 microseconds). The charge of the first voltage is substantially maintained by the LED based upon inherent capacitance properties of the LED. Under reverse bias conditions, light intensity of light incident on the LED corresponds to a photocurrent produced by the LED. In an example, voltage of the LED is polled to determine a decay time corresponding to a time span from when the LED is charged to the first voltage until the LED discharges to a second voltage, such as a voltage representing a logical 0. The decay time is inversely proportional to an amount of light detected by the LED, and thus the photocurrent can be calculated based upon the decay time. That is, when the LED detects relatively increased amounts of light, the LED discharges faster, thus resulting in a decreased decay time. When the LED detects relatively decreased amounts of light, the LED discharges slower, thus resulting in an increased decay time.

The validator 1024 may be configured to detect color levels associated with the label based upon light detected by of the first photodiode 1006, the second photodiode 1008, and/or the third photodiode 1010 (e.g., based upon a photocurrent, voltage level, decay time, etc.). It may be appreciated that a wide variety of electrical-based and/or software-based detection techniques may be used to identify color, shape, and/or texture of a label, and that merely a few examples are provided for illustrative purposes. The validator 1024 may be configured to convert the electrical measurement data (e.g., conductivity, voltage, current, etc.) into detected cylindrical color coordinates derived from a hue, saturation, and luminance (HSL) model. In this way, the validator 1024 may compare the detected cylindrical color coordinates with acceptable cylindrical color coordinates specified by a dispensing key, for example.

Calibration/Tolerance

In some embodiments, a label for use on a refill container for a dispensing system is provided. The label may be used to train the dispensing system for improved accuracy in detecting acceptable color codes on labels for enabling operation of refill containers by the dispensing system. That is, the dispensing system may be initially calibrated with an analog dispensing key. In an example, the analog dispensing key may correspond to one or more analog color tolerance ranges specifying analog ranges of acceptable color values (e.g., red, blue, green, and white levels). However, accuracy of the analog dispensing key may be diminished based upon various factors, such as inaccuracy of color detection technology (e.g., the dispensing system may comprise photo- diodes as opposed to sophisticated color detection technology due to a tradeoff of color detection accuracy for cost efficiency), color variations in label print runs or printing machines, etc. Accordingly, the dispensing system may be trained by modifying the analog dispensing key to create a refined analog dispensing key based upon feedback provided by color codes on labels.

Figure 3:
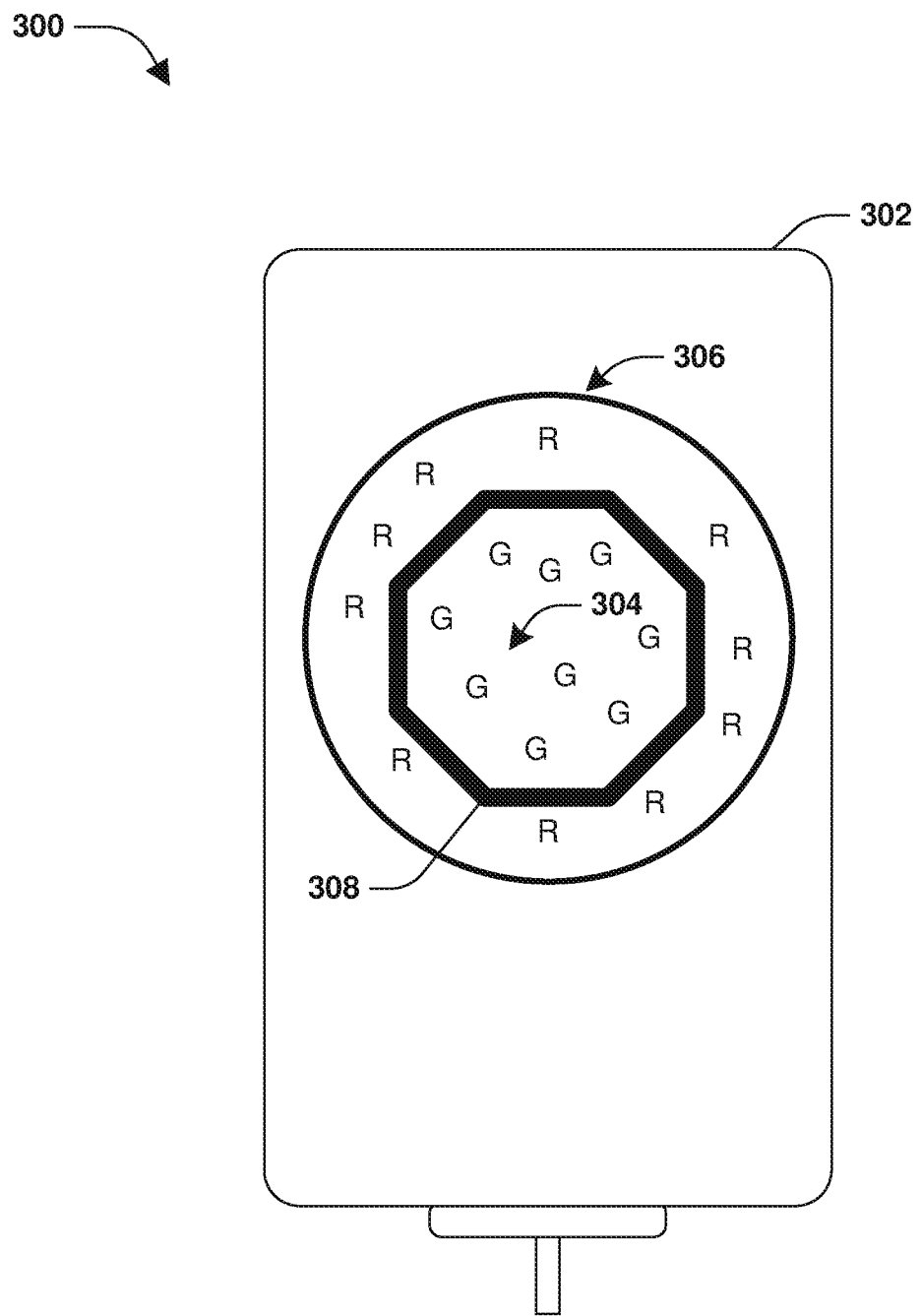
FIG. 3 is an illustration of a label, applied to a refill container, comprising a first region and a second region, according to some embodiments.
Figure 4:
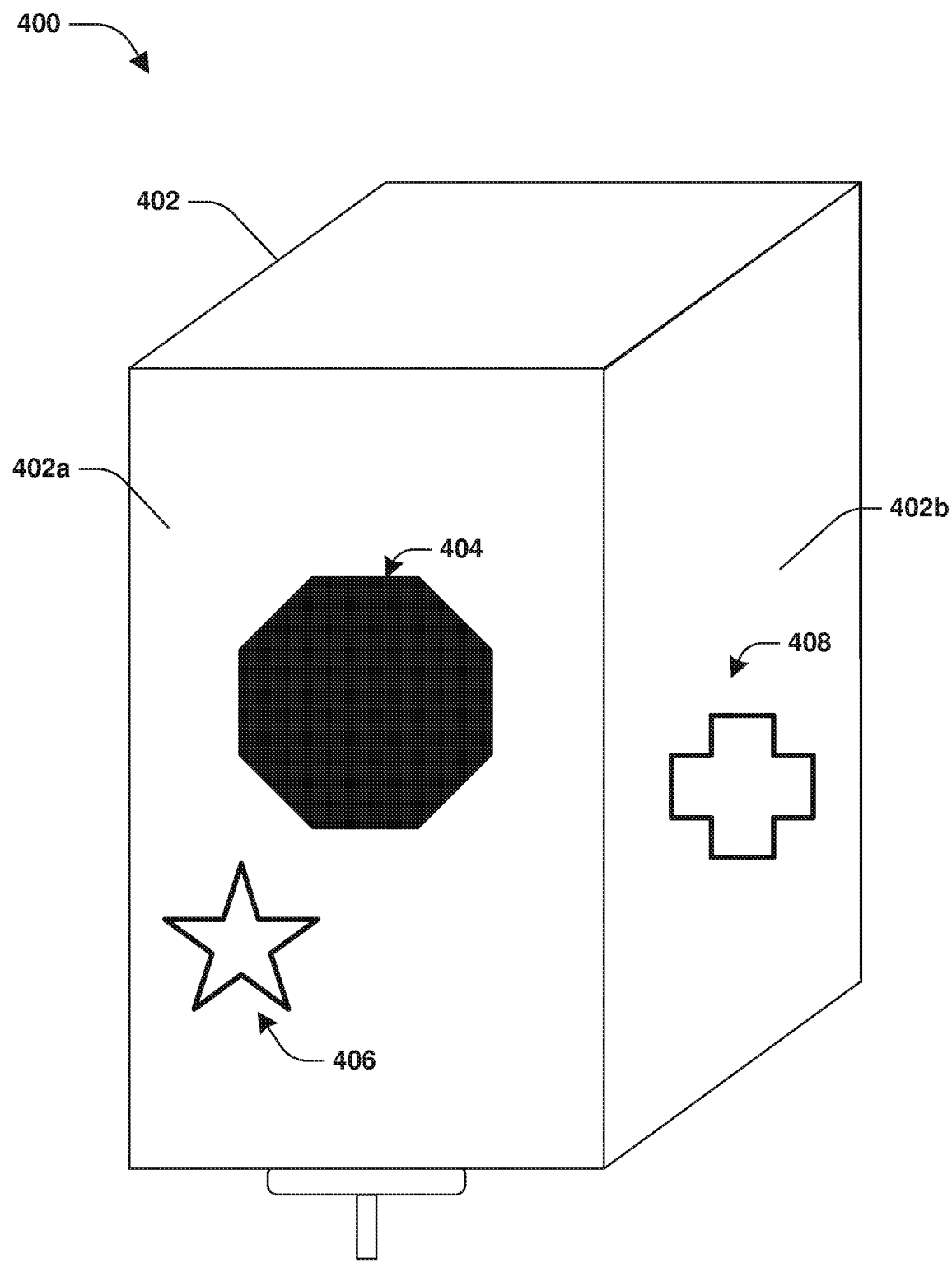
FIG. 4 is an illustration of a label, applied to a refill container, comprising a first region on a first surface of the refill container, a second region on a second side of the refill container, and an inactive region on the first surface of the refill container, according to some embodiments.
Figure 5:
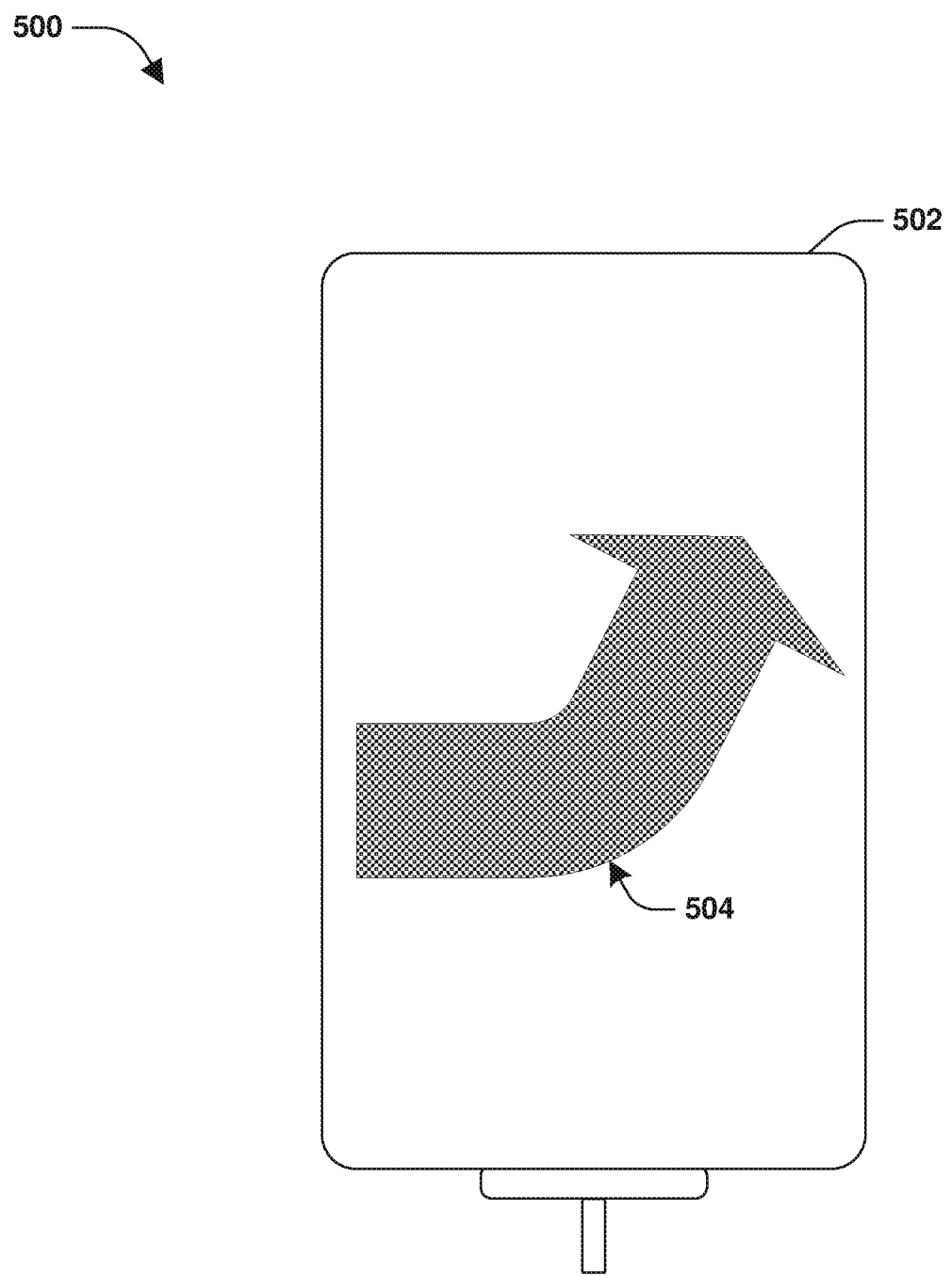
FIG. 5 is an illustration of a label, applied to a refill container, comprising a first region, according to some embodiments.
Figure 6:
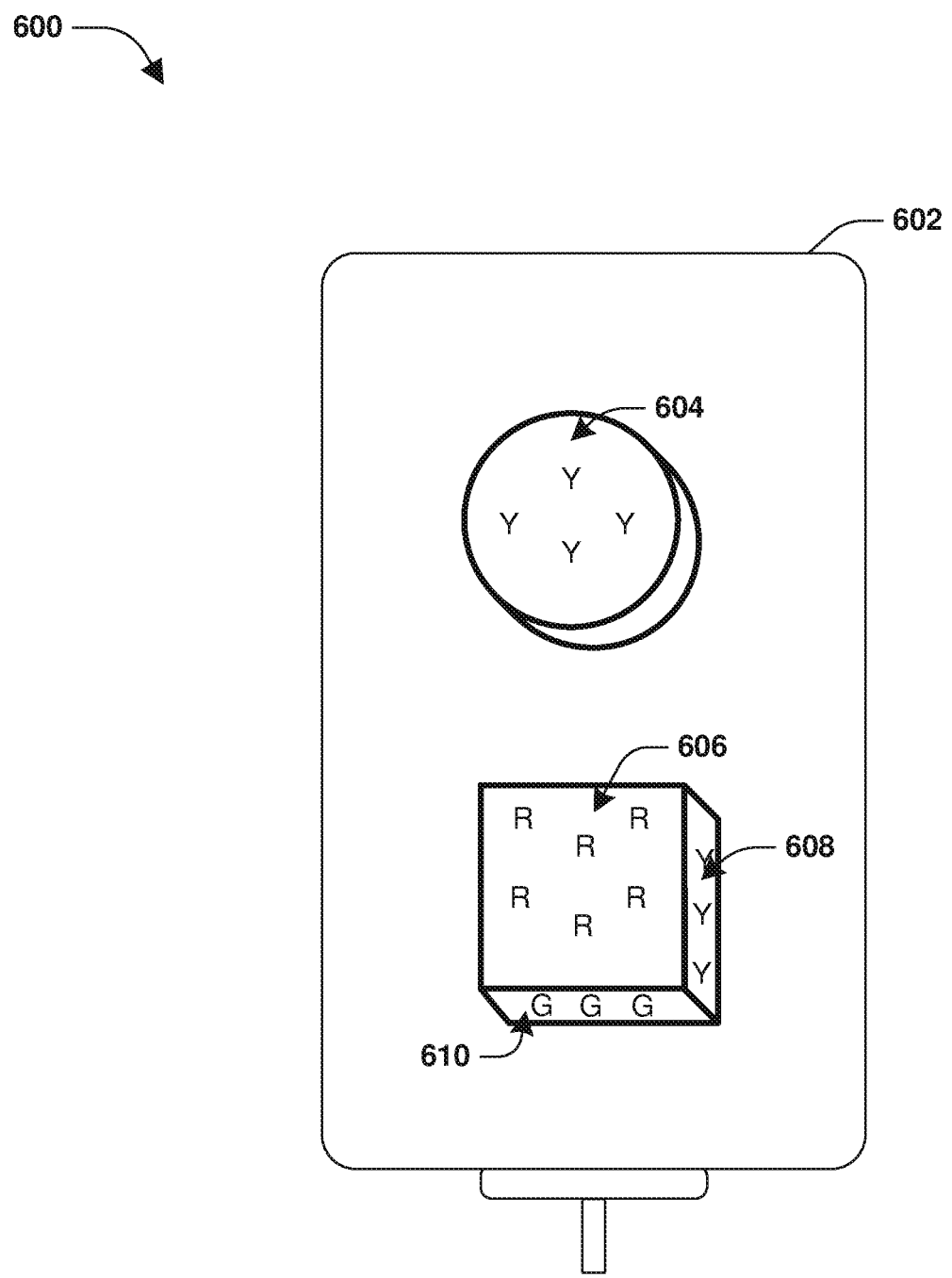
FIG. 6 is an illustration of a 3D label, applied to a refill container, comprising a first 3D region and a second 3D region, according to some embodiments.

In an example, the label comprises one or more color codes (e.g., circular shaped indicia 306 comprises a red color code and octagonal shaped indicia 304 comprises a green color code, as illustrated in FIG. 3). For example, the label comprises a first color code (e.g., a blue color code corresponding to a shade of blue) detectable by the dispensing system. The dispensing system may maintain the analog dispensing key specifying one or more analog color tolerance ranges, such as a first analog color tolerance range (e.g., a range of blue colors) and a second analog color tolerance range (e.g., a range of green colors that are adjacent to blue colors on a color wheel). It may be appreciated that the analog dispensing key may not be initially calibrated with correct analog color tolerance ranges, and thus may initially specify more acceptable color ranges than are to be accepted (e.g., blue colors codes, but not green color codes, are actually to be accepted, however, initial calibration may be inaccurately specified shades of green). If a color code of a label satisfies at least one analog color tolerance range specified by the analog dispensing key, then the dispensing system may enable operation of the refill container, otherwise the dispensing system may not enable operation of the refill container. If the color code satisfies the first analog color tolerance range (e.g., the blue color is within the range of blue colors) and not the second analog color tolerance range, then the dispensing system modifies at least one of the first analog color tolerance range or the second analog color tolerance range to create a refined analog dispensing key. In an example, the first analog color tolerance range is affirmed. In another example, the second analog color tolerance range is removed (e.g., the analog dispensing key may have been initially calibrated to detect blue and/or green as acceptable colors, however, the blue color code of the label may be used to refine the analog dispensing key to merely accept shades of blue, thus filtering out shades of green that were not actually supposed to be acceptable colors). In another example, the second analog color tolerance range may be narrowed (e.g., the second analog color tolerance range may be narrowed to merely correspond to shades of green that are similar to blue). In this way, the analog dispensing key may be refined based upon color codes of labels detected by the dispensing system (e.g., a first label of a first refill container, a second label of a second refill container, a threshold number of labels before the dispensing system disables further refinement of the analog dispensing key, etc.).

Validation Using Server

In some embodiments, the dispensing system is in operable communication with a server (e.g., a local computer server or a cloud computing system), and the validator functions in cooperation with the server to determine whether to enable operation of the refill container thereof. For example, the dispensing system may comprise a wireless communication device, such as a near field communication (NFC) transceiver, a Wi-Fi transceiver, a Bluetooth® transceiver, or other radio transceiver, or may comprise a wired communication device, such as an Ethernet card, that enables communication between the dispensing system and a server through a network.

In some embodiments, upon the validator determining information about an indicia (e.g., details regarding the QR code or the barcode) based upon signals received from a visual detector, the validator communicates with the server using the network to provide data (e.g., information) about the indicia to the server. In some embodiments, the server returns to the validator data describing whether to enable or disable operation of the refill container. For example, in some embodiments, the server may store a table listing the type of material to be dispensed for each of a plurality of dispensing systems, listing a type of material stored in each refill container, and listing a QR code or barcode associated with each refill container. In some embodiments, the validator is configured to send to the server information regarding the QR code or barcode and an identifier of the dispensing system. Based upon this information, the server uses the table to determine what type of material is to be dispensed from the dispensing system (identified from the identifier contained in the data sent from the validator) and what type of material is stored in the refill container (identified from the information regarding the QR code or the barcode). If the type of material stored in the refill container matches the type of material that is to be dispensed from the dispensing system, the server may send to the validator an instruction to allow or enable operation of the refill container. If the type of material stored in the refill container does not match the type of material that is to be dispensed from the dispensing system, the server may send to the validator an instruction to not allow or to disable operation of the refill container.

In some embodiments, a table akin to the aforementioned table may be provided to the validator for storage within non-volatile memory of the dispensing system. Upon a new refill container being inserted into the dispensing system, the validator may use the pre-stored table to determine whether the type of material stored in the refill container matches the type of material that is to be dispensed from the dispensing system, thereby determining whether to enable or disable operation of the refill container without having to communication with the server upon the new refill container being inserted into the dispensing system.

In some embodiments, the instruction sent from the server may include other information, in addition to or instead of a notification to enable/disable operation of the refill container. For example, in some embodiments, the instruction may comprise an expiration date indicating when the material within the refill container is to expire. In some embodiments, the validator may store the expiration date in non-volatile memory associated with the dispensing system. In some embodiments, when the dispensing system detects a trigger to perform a dispense event to dispense material from the refill container (e.g., motion that triggers a dispense event), the validator may compare a current date with the expiration date. If the current date is before the expiration date, the validator may enable operation of the refill container to perform the dispense event. If the current data is after the expiration date, the validator may disable operation of the refill container to inhibit dispensing of the expired material.

In some embodiments, the validator is configured to intermittently, periodically, and/or upon the occurrence of a specified event (e.g., detection of a trigger to perform a dispense event) communicate with the server. For example, the validator may periodically provide to the server details regarding the QR code or barcode and an identifier of the dispensing system. The server may use this information to confirm that the type of material stored in the refill container continues to match the type of material that is to be dispensed from the dispensing system (i.e., confirm that the type of material that is to be dispensed from the dispensing system has not been changed) and to confirm that the expiration date of the material has not lapsed. If the server determines that the type of material stored in the refill container no longer matches the type of material that is to be dispensed from the dispensing system and/or the expiration date of the material has lapsed, the server may send to the validator an instruction to not enable or to disable operation of the refill container.

In some embodiments, the validator may provide other and/or additional information that enables the server to store metrics pertaining to the dispensing system and/or the refill container. For example, validator may track the number of dispense events and may sending information pertaining to the number of dispense events to the server. In some embodiments, the server may use the number of dispense events and the indicia (e.g., QR code or barcode) to estimate a volume of refill material remaining in the refill container. For example, from the indicia, the server may be able to determine the type of refill material present in the refill container and the volume of refill material present in the refill container when the refill container was originally filled with refill material. Based upon the information determined from the indicia and the number of dispense events that have occurred since the refill container was inserted into the dispensing system, the server may estimate an approximate volume of refill material remaining in the refill container. In some embodiments, the server is configured to generate a visual, auditory, etc. alert when the approximate volume of refill material remaining in the refill container is estimated to be less than a defined threshold.

Programming Mode

Figure 11:
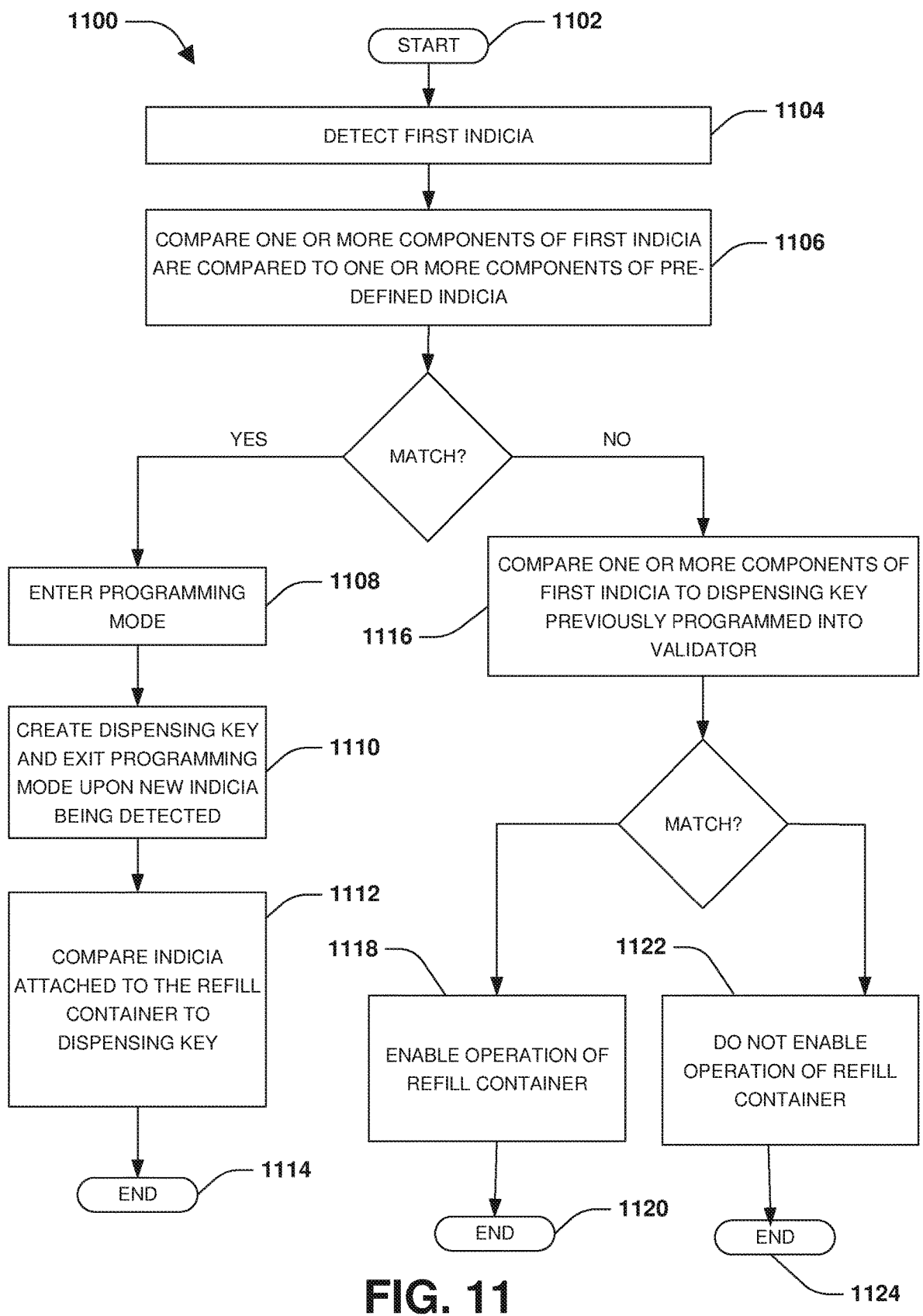
FIG. 11 is a flow diagram illustrating a method of, among other things generating a dispensing key, according to some embodiments.

FIG. 11 illustrates an example method 1100 for programming a validator of a dispensing system to generate a dispensing key, in accordance with some embodiments. Referring to FIG. 11, in some embodiments, one or more components of a pre-defined indicia, such as a predefined color, shape, texture, etc. are hardcoded into a dispensing system or a validator of the dispensing system. For example, data corresponding to components of the pre-defined indicia are stored in non-volatile memory associated with the dispensing system. In some embodiments, upon detection of the pre-defined indicia, the validator is configured to enter into a programming mode.

At 1102, the example method 1100 starts, and at 1104 in the example method 1100, a first indicia is detected by the validator. For example, the first indicia is inserted into a space defined by the dispensing system where the refill container is generally seated or housed. An illuminator of the dispensing system may illuminate the first indicia, and a visual detector of the dispensing system may detect light emitted by the illuminator after interaction with the first indicia (e.g., after being reflected by the first indicia).

At 1106 in the example method 1100, one or more components of the first indicia are compared to the one or more components of the pre-defined indicia. When the one or more components of the first indicia correspond to (e.g., match) the one or more components of the pre-defined indicia, a programming mode is entered at 1108. While in the programming mode, the validator waits for visual detector to detect a new indicia. At 1110 in the example method 1100, upon a new indicia being detected, components of the new indicia are stored in non-volatile memory of the dispensing event to create a dispensing key and exit programming mode, causing the dispensing system to return to a non-programming mode. Subsequently when a refill container is inserted into the dispenser, one or more indicia attached to the refill container are compared to the dispensing key created at 1112. The example method 1000 ends at 1114.

When the one or more components of the first indicia do not correspond to the one or more components of the pre-defined indicia, the one or more components of the first indicia are compared, at 1116, to a dispensing key(s) previously programmed into the validator, if any dispensing key(s) have been previously programmed into the validator. When the one or more components of the first indicia satisfy (e.g., match) a dispensing key previously programmed into the validator, the validator enables operation of the refill container at 1118 (e.g., as described with respect to FIGS. 1-10). The example method 1000 ends at 1120. When the one or more components of the first indicia do not satisfy any dispensing key previously programmed into the validator, the validator does not enable operation of the refill container at 1122 (e.g., as described with respect to FIGS. 1-10). The example method 1000 ends at 1124.

It is to be appreciated that while the example method 1100 provides for comparison of the one or more components of the first indicia to the one or more components of the pre-defined indicia prior to a comparison of the one or more components of the first indicia to any dispensing keys already programmed into the validator, in other embodiments, the comparison of the one or more components of the first indicia to any dispensing keys already programmed into the validator may occur prior to the comparison of the one or more components of the first indicia to the one or more components of the pre-defined indicia (e.g., and the comparison of the one or more components of the first indicia to the one or more components of the pre-defined indicia may occur only if the one or more components of the first indicia do not correspond to a dispensing key already programmed into the validator) or the comparisons at 1106 and 1110 may occur concurrently.

In some embodiments, the method 1100 can be performed by a manufacturer, can be performed when the dispensing system is originally installed in the field, and/or can be performed whenever the dispensing key is to be changed (e.g., to enable a new type of material to be dispensed from the dispensing system).

As an example of the method 1100, when the dispensing system is manufactured, the manufacture may place a first color swatch, having a first color (e.g., blue) hardcoded into the dispensing system that is configured to initiate a programming mode, into a space in which a refill container is seated when the refill container is subsequently placed into the dispensing system. Upon the dispensing system or the validator thereof entering into a programming mode, the manufacturer may place a second color swatch having a second color (e.g., green, yellow, etc.) into the space in which the refill container is seated when the refill container is subsequently placed into the dispensing system. The second color may be associated by the manufacturer, distributor, etc. with a particular type of refill material. For example, green may correspond to an anti-bacterial soap, yellow may correspond to lotion, etc. Therefore, if the manufacturer or distributor intends to have the dispensing system installed in an environment that calls for lotion to be dispensed from the dispensing system, the second color swatch may be yellow to program the validator to enable operation of the refill container upon a refill container having a yellow indicia being installed therein. If the manufacturer or distributor intends to have the dispensing system installed in an environment that calls for anti-bacterial soap to be dispensed from the dispensing system, the second color swatch may be green to program the validator to enable operation of the refill container upon a refill container having a yellow indicia being installed therein.

Upon the second color being detected, components of the second color (e.g., saturation, hue, etc.) may be stored in the non-volatile memory of the dispensing system to generate a dispensing key, and the dispensing system may exit the programming mode (e.g., entering a non-programming mode). Subsequently, when the visual detector detects an indicia (e.g., attached to a refill container inserted into the dispensing system), the validator determines whether the indicia satisfies the dispensing key or whether the indicia has the first color that is configured to initiate a programming mode. If the validator determines that the indicia satisfies the dispensing key, the validator may enable operation of the refill container. If the validator determines that the indicia has the first color that is configured to initiate a programming mode, the validator may (re)enter a programming mode. If the validator determines that the indicia does not satisfy the dispensing key and is not the first color that is configured to initiate the programming mode, the validator may disable operation of the refill container.

Parameter Control of Dispense Event

In some embodiments, in additional to the indicia being used to determine whether to enable operation of the refill container or instead of the indicia being used to determine whether to enable operation of the dispensing system, the indicia may be used to set or control parameters of a dispense event during which material is dispensed from the dispensing system. For example, in some embodiments, a first indicia or a first aspect of the first indicia (such as the hue of a colored label) is compared to a dispensing key to determine whether to enable operation of the refill container and a second indicia or a second aspect of the first indicia (such as saturation of the colored label) may be used to determine at least one of a dosage of the material to be dispensed during the dispense event, a material-to-air ratio, a speed at which the material is to be dispensed during a dispense event, etc. As an example, in some embodiments, in addition to storing the dispensing key, a table is stored in non-volatile memory. The table may list various saturation values in correspondence with various dosages of material (e.g., a first saturation value may correspond to a first dosage, a second saturation value may correspond to a second dosage, etc.). When the indicia is detected by the validator, a saturation value associated with the indicia may be determined and compared to the table to determine a dosage of material that is to be dispensed during a dispense event while the refill container is present in the dispensing system.

In some embodiments, such as where the indicia on a refill container is a QR code or a barcode, the validator may be configured to send information about the QR or the barcode to the server (e.g., as described in the section titled "Validation using server"). In response to receiving information about the QR code or the barcode to the server, the server may determine whether refill container is valid (e.g., as described in the section titled "Validation using server") and/or may determine one or more parameters for dispensing material from the dispensing system during a dispense event. For example, the server may use the QR code or the barcode to determine a dosage of the material to dispense during a dispense event, a material-to-air ratio for the dispense event, or a speed at which the material is to be dispensed from the dispensing system during the dispense event. Information may be sent from the server to the validator that comprises, among other things, a notification regarding whether to enable operation of the dispensing system and/or a parameter for dispensing the hygiene material from the dispensing system. In response to receiving the information from the server, the validator may enable operation of the dispensing system when the notification indicates to enable operation of the dispensing system and/or configure the dispensing system according to the parameter.

In an example, the first color code is affixed (e.g., as a first indicia) to a first side of the refill container and a second color code of the label is affixed (e.g., as a second indicia) to a second side of the refill container. It may be appreciated that the label may comprise any number of color codes arranged according to various configurations (e.g., shapes, sizes, orientations, etc.). In an example, the first color code, and/or second color code, etc. may comprise ink that changes based upon time, humidity, temperature, light, and/or other factors.

In an example, the dispensing system comprises a validator configured to implement fuzzy logic to learn based upon labels detected by the dispensing system. The validator may be configured to modify the analog dispensing key to create the refined analog dispensing key.

In some embodiments, a label comprises a first color code detectable by a dispensing system. The first color code may be configured to invoke the dispensing system to generate an analog dispensing key specifying a first analog color tolerance range and a second analog color tolerance range used to determine whether the dispensing system enables operation of a second refill container subsequently associated with the dispensing system. The first analog color tolerance range and/or the second analog color tolerance range may be modified based upon detection of a second color code affixed to the second refill container. In this way, the analog dispensing key may be refined.

In an embodiment of a label for use on a refill container for a dispensing system, a dispensing system comprises a first color code detectable by the dispensing system comprising an analog dispensing key specifying a first analog color tolerance range and a second analog color tolerance range, such that responsive to the first color code corresponding to the first analog color tolerance range and not the second analog color tolerance range, then the dispensing system modifies at least one of the first analog color tolerance range or the second analog color tolerance range to create a refined analog dispensing key.

In an embodiment, the first color code is configured to invoke the dispensing system to remove the second analog color tolerance range responsive to the first color code corresponding to the first analog color tolerance range and not the second analog color tolerance range.

In an embodiment, the first color code is configured to invoke the dispensing system to narrow the second analog color tolerance range responsive to the first color code corresponding to the first analog color tolerance range and not the second analog color tolerance range.

In an embodiment, the first color code is configured to invoke the dispensing system to confirm the first analog color tolerance range as an acceptable color code for activation of the dispensing system responsive to the first color code corresponding to the first analog color tolerance range and not the second analog color tolerance range.

In an embodiment, the first color code is configured to invoke the dispensing system to enable operation of the refill container based upon the first color code satisfying at least one of the first analog color tolerance range or the second analog color tolerance range.

In an embodiment, a second color code is detectable by the dispensing system, such that if the first color code and the second color code satisfy the analog dispensing key, then the dispensing system enables operation of the refill container, otherwise the dispensing system does not enable operation of the refill container.

In an embodiment, the first analog color tolerance range corresponds to a first color and the second analog color tolerance range corresponding to a second color.

In an embodiment, the first color is adjacent to the second color within a color wheel.

In an embodiment, the first color code corresponds to a first color and the second color code corresponding to a second color.

In an embodiment, the first color code is affixed to a first portion of the refill container and the second color code is affixed to a second portion of the refill container.

In an embodiment, the first color code is affixed to a first side of the refill container and the second color code is affixed to a second side of the refill container.

In an embodiment, the first color code comprises ink that changes based upon at least one of time, humidity, temperature, or light.

In an embodiment, the first color code comprises a first shape and the second color code comprising a second shape.

In an embodiment of a label for use on a refill container for a dispensing system, a dispensing system comprises a first color code detectable by the dispensing system comprising an analog dispensing key specifying an analog color tolerance range, the first color code configured to invoke the dispensing system to modify the analog color tolerance range to create a refined analog dispensing key based upon detected color data associated with detection of the first color code.

In an embodiment, the first color code is configured to invoke the dispensing system to narrow the analog color tolerance range responsive to the first color code corresponding to the analog color tolerance range.

In an embodiment, the first color code is configured to invoke the dispensing system to expand the analog color tolerance range responsive to the first color code not corresponding to the analog color tolerance range.

In an embodiment, the first color code is configured to invoke the dispensing system to confirm the analog color range within the refined analog dispensing key responsive to the first color code corresponding to the analog color tolerance range.

In an embodiment, the first color code is configured to invoke the dispensing system to create a second analog color tolerance range within the refined analog dispensing key responsive to the first color code falling outside the analog color tolerance range.

In an embodiment of a label for use on a refill container for a dispensing system, a dispensing system comprises a first color code detectable by the dispensing system, the first color code configured to invoke the dispensing system to generate an analog dispensing key specifying a first analog color tolerance range and a second analog color tolerance range used to determine whether the dispensing system enables operation of a second refill container subsequently associated with the dispensing system.

In an embodiment, at least one of the first analog color tolerance range or the second analog color tolerance range is modifiable based upon detection of a second color code affixed to the second refill container.

Figure 12:
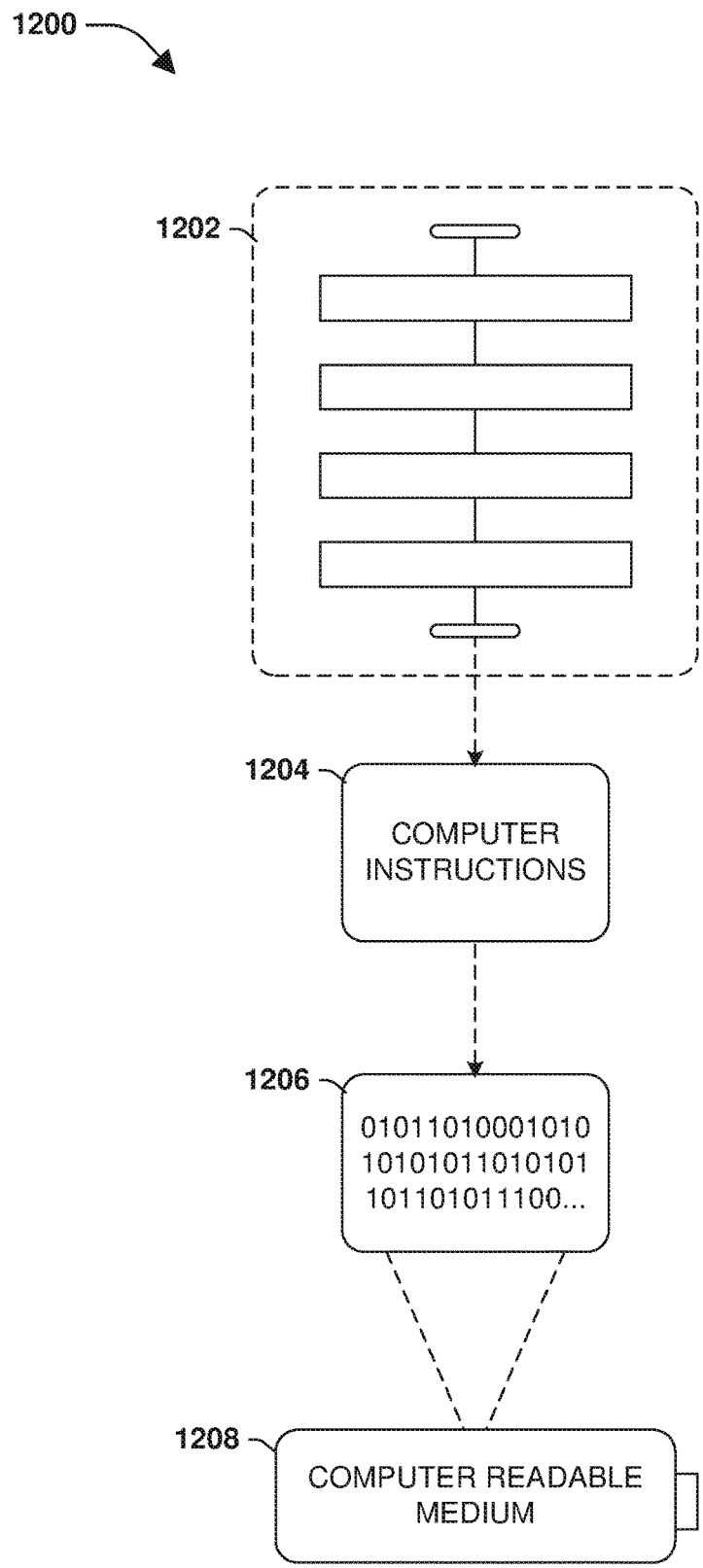
FIG. 12 is an illustration of an example computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 12, wherein the implementation 1200 comprises a computer-readable medium 1208, such as a CD-ft DVD-R, flash drive, a platter of a hard disk drive, etc., on which is encoded computer-readable data 1206. This computer-readable data 1206, such as binary data comprising at least one of a zero or a one, in turn comprises a set of processor-executable computer instructions 1204 configured to operate according to one or more of the principles set forth herein. In some embodiments, the processor-executable computer instructions 1204 are configured to perform a method 1202, such as at least some of the exemplary method 100 of FIG. 1 and/or exemplary method 1100 of FIG. 11, for example. In some embodiments, the processor-executable instructions 1104 are configured to implement a system, such as at least some of the exemplary system 800 of FIG. 8 and/or at least some of the exemplary system 900 of FIG. 9, for example. Many such computer-readable media are devised by those of ordinary skill in the art that are configured to operate in accordance with the techniques presented herein.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first shape and a second shape generally correspond to shape A and shape B or two different or identical shapes or the same shape.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A method comprising:
    detecting a first indicia inserted into a dispensing system;
    determining whether the first indicia corresponds to a pre-defined indicia;
    when the first indicia corresponds to the pre-defined indicia, placing the dispensing system in a programming mode;
    detecting a second indicia, different than the first indicia, inserted into the dispensing system while the dispensing system is in the programming mode;
    generating a dispensing key based upon one or more components of the second indicia;
    receiving a refill container in the dispensing system;
    detecting a third indicia, different than the first indicia, attached to the refill container and a fourth indicia attached to the refill container;
    comparing the third indicia to the dispensing key;
    enabling the dispensing system to dispense hygiene material stored within the refill container responsive to determining that the third indicia satisfies the dispensing key based upon the comparing; and
    determining a parameter of a dispense event based upon the fourth indicia.

2. The method of claim 1, comprising:
    placing the dispensing system in a non-programming mode upon generating the dispensing key.

3. The method of claim 1, wherein the parameter comprises at least one of a dosage of the hygiene material to dispense during the dispense event in which the hygiene material is dispensed from the dispensing system, a material-to-air ratio for the dispense event, or a speed at which the hygiene material is dispensed from the dispensing system during the dispense event.

4. The method of claim 1, wherein the third indicia is hue of a color on a label attached to the refill container and the fourth indicia is saturation of the color on the label.

5. The method of claim 1, wherein the first indicia is a first color and the second indicia is a second color different than the first color.

6. A dispensing system comprising:
    a housing defining a space into which a refill container comprising hygiene material is seated; and
    a validator configured to:
        detect a first indicia inserted into the space;
        determine whether the first indicia corresponds to a pre-defined indicia;
        when the first indicia corresponds to the pre-defined indicia, place the dispensing system in a programming mode;
        detect a second indicia, different than the first indicia, inserted into the dispensing system while the dispensing system is in the programming mode;

generate a dispensing key based upon one or more components of the second indicia;

detect a third indicia and a fourth indicia upon the refill container being seated in the space;

compare the third indicia to the dispensing key;

enable the dispensing system to dispense the hygiene material when the third indicia satisfies the dispensing key based upon the comparison; and determine a parameter of a dispense event based upon the fourth indicia.

7. The dispensing system of claim 6, wherein the refill container defines a compartment for storing a power source, and the third indicia is disposed on a surface of the compartment.

8. The dispensing system of claim 6, wherein the parameter comprises at least one of a dosage of the hygiene material to dispense during the dispense event in which the hygiene material is dispensed from the dispensing system, a material-to-air ratio for the dispense event, or a speed at which the hygiene material is dispensed from the dispensing system during the dispense event.

9. The dispensing system of claim 6, wherein the third indicia is hue of a color on a label attached to the refill container and the fourth indicia is saturation of the color on the label.

10. The dispensing system of claim 6, wherein the validator is configured to place the dispensing system in a non-programming mode upon generating the dispensing key.

11. The dispensing system of claim 6, comprising an illuminator configured to illuminate a label attached to the refill container upon the refill container being seated in the space.

12. The dispensing system of claim 11, comprising a detector configured to detect a reflection of light emitted from the illuminator and incited on the label, the detector operably coupled to the validator.

13. A dispensing system comprising:

a housing defining a space into which a refill container comprising hygiene material is seated, wherein the refill container comprises a QR code; and a validator configured to:

detect the QR code;

transmit information about the QR code to a server;

receive information from the server in response to transmitting the information about the QR code, wherein the information from the server comprises a notification regarding whether to enable operation of the dispensing system and a parameter for dispensing the hygiene material from the dispensing system;

enable operation of the dispensing system when the notification indicates to enable operation of the dispensing system; and configure the dispensing system according to the parameter.

14. The dispensing system of claim 13, wherein the parameter comprises at least one of a dosage of the hygiene material to dispense during a dispense event in which the hygiene material is dispensed from the dispensing system, a material-to-air ratio for the dispense event, or a speed at which the hygiene material is dispensed from the dispensing system during the dispense event.

15. The dispensing system of claim 13, wherein the refill container defines a compartment for storing a power source, and the QR code is disposed on a surface of the compartment.

16. A dispensing system comprising:

a housing defining a space into which a refill container comprising hygiene material is seated; and a validator configured to:

detect a first indicia inserted into the space;

determine whether the first indicia corresponds to a pre-defined indicia;

when the first indicia corresponds to the pre-defined indicia, place the dispensing system in a programming mode;

detect a second indicia, different than the first indicia, inserted into the dispensing system while the dispensing system is in the programming mode;

generate a dispensing key based upon one or more components of the second indicia;

detect a third indicia upon the refill container being seated in the space, wherein the refill container defines a compartment for storing a power source, and the third indicia is disposed on a surface of the compartment;

compare the third indicia to the dispensing key; and enable the dispensing system to dispense the hygiene material when the third indicia satisfies the dispensing key based upon the comparison.

17. The dispensing system of claim 16, wherein the validator is configured to place the dispensing system in a non-programming mode upon generating the dispensing key.

18. The dispensing system of claim 16, comprising an illuminator configured to illuminate a label attached to the refill container upon the refill container being seated in the space.

19. The dispensing system of claim 18, comprising a detector configured to detect a reflection of light emitted from the illuminator and incited on the label, the detector operably coupled to the validator.

20. The dispensing system of claim 16, wherein the validator is configured to:

detect a fourth indicia upon the refill container being seated in the space, wherein the third indicia is a first component of a label attached to the refill container and the fourth indicia is a second component of the label; and determine a parameter of a dispense event based upon the fourth indicia.

* * * * *